(12) United States Patent
Hamblin et al.

(10) Patent No.: US 8,550,168 B2
(45) Date of Patent: Oct. 8, 2013

(54) STABPLATE CONNECTIONS

(75) Inventors: Andrew Simon Hamblin, Portishead (GB); Gareth H. Lewis, Bristol (GB)

(73) Assignee: Vetco Gray Controls Limited, Nailsea, Bristol (GB)

( * ) Notice: Subject to any disclaimer, the term of this patent is extended or adjusted under 35 U.S.C. 154(b) by 157 days.

(21) Appl. No.: 12/916,811

(22) Filed: Nov. 1, 2010

(65) Prior Publication Data
US 2012/0102684 A1 May 3, 2012

(30) Foreign Application Priority Data

Nov. 20, 2009 (GB) .................................. 0920356.3

(51) Int. Cl.
*E21B 7/12* (2006.01)
(52) U.S. Cl.
USPC ........... 166/341; 166/343; 166/368; 166/93.1
(58) Field of Classification Search
USPC .............. 166/341, 343, 368, 93.1, 94.1, 97.1; 285/312, 314, 920
See application file for complete search history.

(56) References Cited

U.S. PATENT DOCUMENTS

| | | | | |
|---|---|---|---|---|
| 1,428,791 A | * | 9/1922 | Loy | 166/92.1 |
| 3,298,092 A | * | 1/1967 | Dozier et al. | 29/429 |
| 3,448,799 A | * | 6/1969 | Ahlstone | 166/346 |
| 3,486,556 A | * | 12/1969 | Burgess | 166/338 |
| 3,536,344 A | * | 10/1970 | Nelson | 285/315 |
| 3,540,533 A | * | 11/1970 | Morrill | 166/387 |
| 3,662,823 A | * | 5/1972 | Murman et al. | 166/338 |
| 3,701,549 A | * | 10/1972 | Koomey et al. | 285/24 |
| 3,820,600 A | * | 6/1974 | Baugh | 166/338 |
| 3,870,098 A | * | 3/1975 | Houston | 166/55.1 |
| 4,004,635 A | * | 1/1977 | Marquaire et al. | 166/343 |
| 4,035,010 A | * | 7/1977 | Kawashita et al. | 294/81.62 |
| 4,160,612 A | * | 7/1979 | Britton et al. | 405/227 |
| 4,161,367 A | * | 7/1979 | Cuiper et al. | 405/169 |
| 4,298,067 A | * | 11/1981 | Lawson | 166/380 |
| 4,328,826 A | * | 5/1982 | Baugh | 137/236.1 |
| 4,333,531 A | * | 6/1982 | Lawson | 166/341 |
| 4,391,330 A | * | 7/1983 | Kiefer | 166/341 |
| 4,427,072 A | * | 1/1984 | Lawson | 166/345 |
| 4,469,181 A | * | 9/1984 | Kellett | 166/341 |
| 5,092,711 A | * | 3/1992 | Langner | 405/169 |
| 5,634,671 A | | 6/1997 | Watkins | |
| 5,690,011 A | * | 11/1997 | Hill et al. | 83/319 |
| 5,774,445 A | * | 6/1998 | Sawi et al. | 720/707 |
| 6,062,312 A | * | 5/2000 | Wilkins | 166/340 |
| 8,011,434 B2 | * | 9/2011 | Cosgrove et al. | 166/341 |
| 2008/0202760 A1 | | 8/2008 | Cosgrove et al. | |

OTHER PUBLICATIONS

GB Search Report dated Feb. 16, 2010 from corresponding Application No. GB090356.3.

* cited by examiner

*Primary Examiner* — Matthew Buck
*Assistant Examiner* — Aaron Lembo
(74) *Attorney, Agent, or Firm* — Global Patent Operation

(57) ABSTRACT

A mechanism for clamping first and second stabplates together comprises a pivoted cam member and clamping means for co-operating with the cam member. The mechanism is such that the cam member is displaceable between a first position in which, in co-operation with the clamping means, it clamps the stabplates together and a second position in which it has rotated to be between the stabplates with the stabplates separate from each other.

10 Claims, 4 Drawing Sheets

STABPLATE CONNECTIONS

BACKGROUND OF THE INVENTION

1. Field of the Invention

The present invention relates to stabplate connections.

2. Description of the Prior Art

Electric and hydraulic power, chemical injection and communications are typically transmitted to subsea wells via an umbilical from a surface or land based platform, the umbilical being terminated at an umbilical termination assembly (UTA). The feeds for hydraulic power and chemical injection are effected from the UTA to a well tree, which houses a well control system, by a multiplicity of self-sealing individual connectors. In order to facilitate mating or unmating of the hydraulic power and chemical injection connectors subsea by a remotely operated vehicle (ROV), they are typically mounted together on a plate known as a stabplate, so that a single ROV action mates all the connectors. Such a stabplate arrangement is normally reserved for the hydraulic power and chemical injection feeds to the well. The ROV locates the stabplate to a fixed reciprocal plate mounted on the subsea tree, and, typically, a screw mechanism is operated by the ROV to force the two plates to mate and to lock them together. The mating and locking screw mechanism is, typically, part of the stabplate connection and remains subsea during the operation of the well. Unmating of the stabplate connection for maintenance/repair purposes involves an operation by an ROV of unscrewing the screw mechanism, which is designed to force the mated plates apart.

The main problem with the arrangement described above is that leaving the screw mechanism subsea for lengthy periods of time can result in corrosion and contamination (e.g. biological growths) which can cause the screw mechanism to seize. The result is either the need for other forceful methods of separating the stabplate from the fixed plate (invariably resulting in expensive damage to the well tree and parts of the stabplate connection) or the additional cost of including a secondary release mechanism in the design of the stabplate connection.

SUMMARY OF THE INVENTION

According to the present invention from one aspect, there is provided a mechanism for clamping first and second stabplates together, the mechanism comprising a pivoted cam member and clamping means for co-operating with the cam member, the mechanism being such that the cam member is displaceable between a first position in which, in co-operation with the clamping means, it clamps the stabplates together and a second position in which it has rotated to be between the stabplates with the stabplates separate from each other.

The mechanism could comprise first and second such cam members which are pivotable to rotate in opposite directions and each of which co-operates with the clamping means.

The mechanism could comprise a locking member between such cam members and displaceable to cause pivotal rotation of the cam members.

The mechanism could comprise a pivot member between such cam members to which each of the cam members is pivotally attached.

According to the present invention from another aspect, there is provided a method for clamping first and second stabplates together or unclamping first and second stabplates from each other, the method comprising: providing a mechanism comprising a pivoted cam member and clamping means which co-operates with the cam member; and displacing the cam member between a first position in which, in co-operation with the clamping means, it clamps the stabplates together and a second position in which it has rotated to be between the stabplates with the stabplates separate from each other.

The mechanism could be received via a central orifice of each of the stabplates and comprise first and second such cam members which pivotally rotate in opposite directions and each of which co-operates with the clamping means.

Such cam members could be displaced by a locking member between the cam members to cause pivotal rotation of the cam members.

Such cam members could be pivotally attached for rotation to a pivot member between the cam members.

DETAILED DESCRIPTION OF THE INVENTION

Referring to the figures, first and second annular stabplates 1 and 2 each carries a multiplicity of connectors 3 and 4 respectively. Typically, one of the stabplates is attached to a well tree and the other is attached to cables from a UTA.

Figure 1:
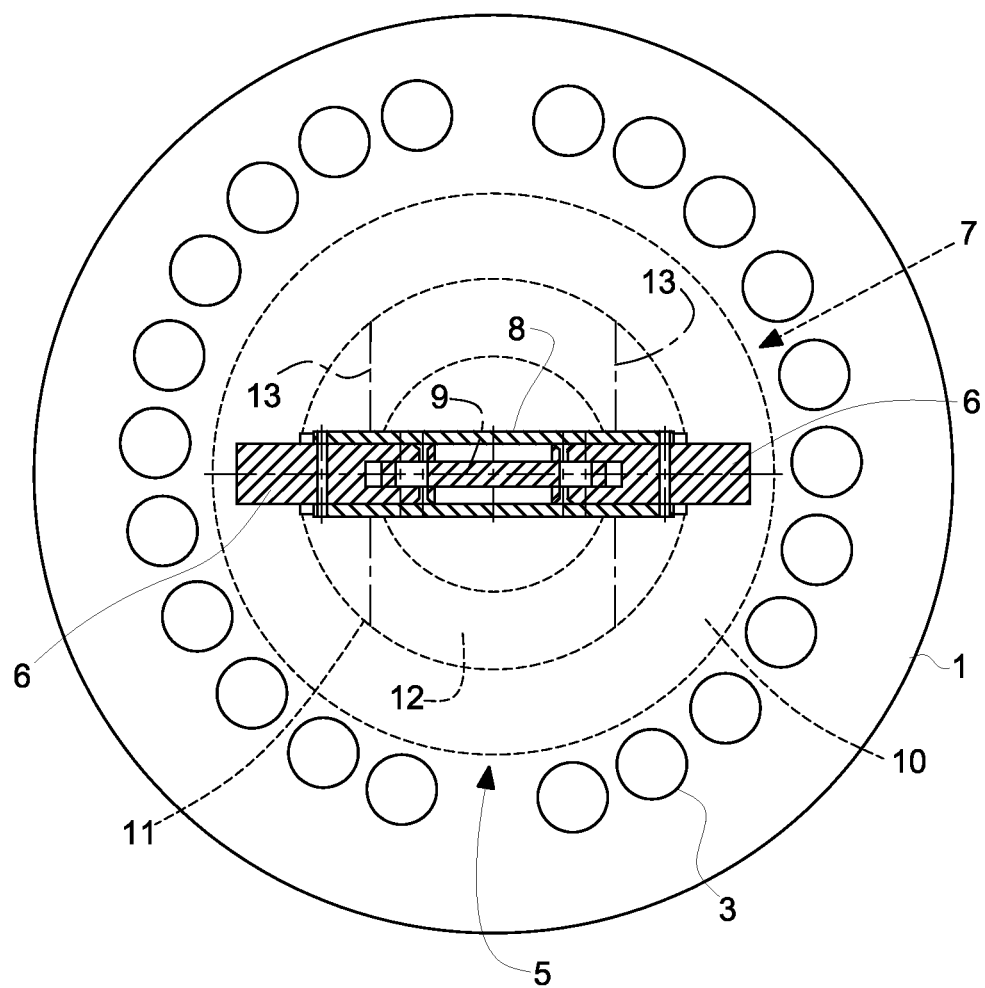
FIG. 1 is a transverse sectional view of a mechanism according to the invention clamping first and second stabplates.
Figure 2:
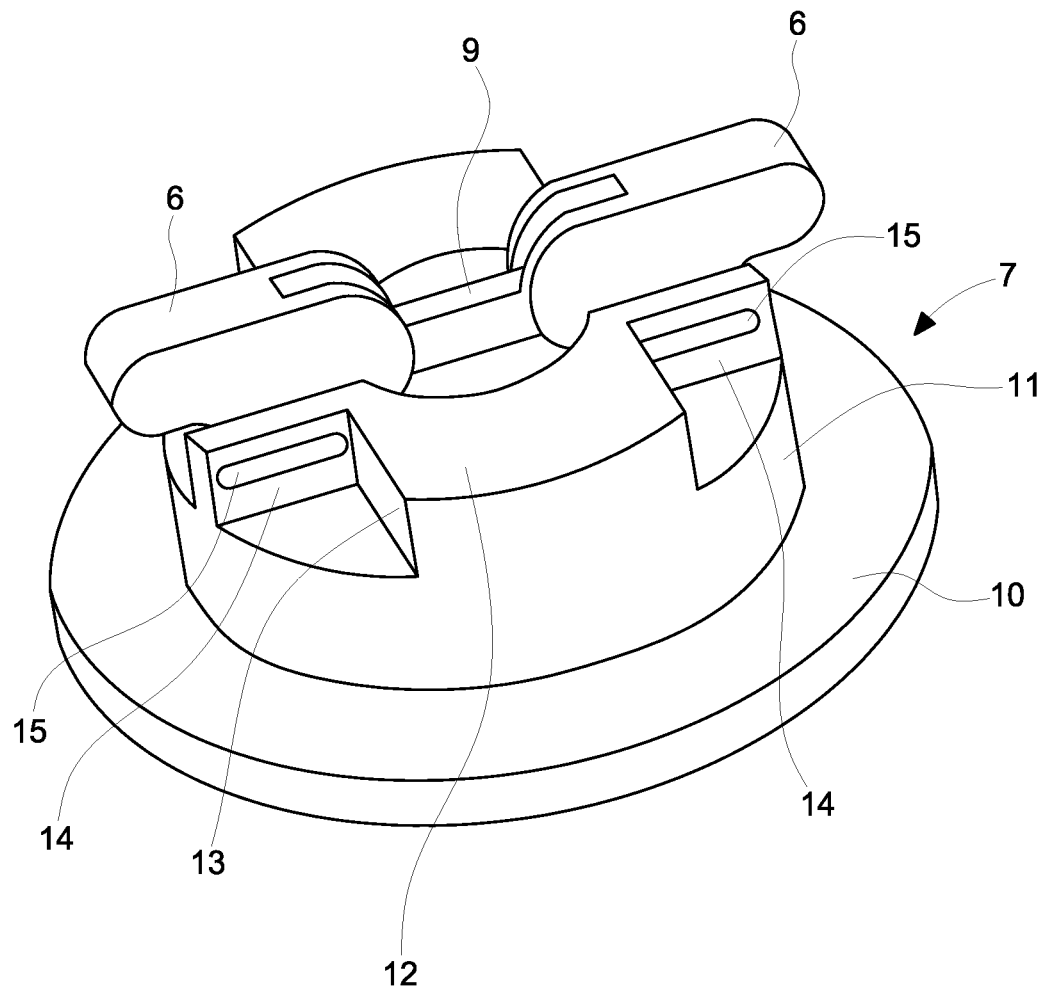
FIG. 2 is a view showing certain elements of the mechanism.
Figure 3A:
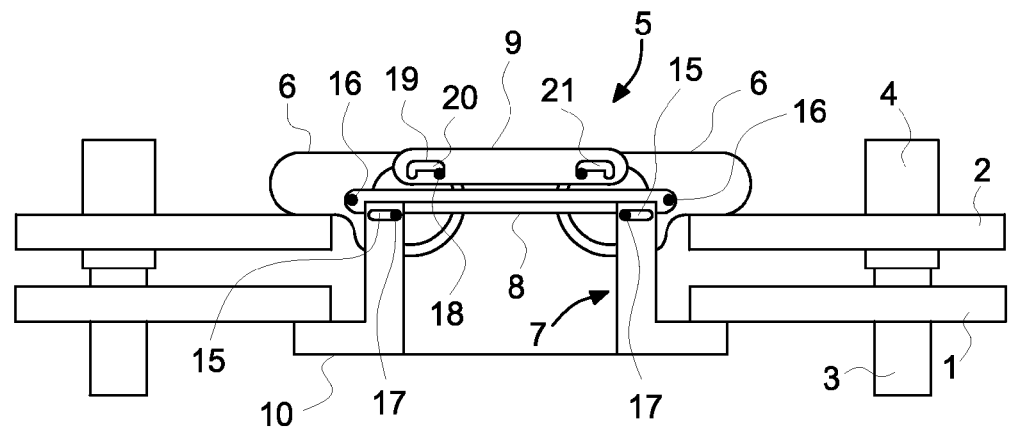
FIGS. 3a-3e show schematically different steps in using the mechanism.

FIGS. 1 and 3a show how the stabplates 1 and 2 are clamped together by a cam mechanism 5, received in a central orifice defined by the stabplates with connectors 3 mated with respective ones of connectors 4. The cam mechanism 5 comprises a pair of cams 6, a clamping member 7, a pair of pivot bars 8 and between the cams 6 a locking bar 9, the pivot bars 8 being on opposite sides of bar 9. In FIG. 3a, bar 9 is shown in the locking position to prevent the cams 6 from allowing the stabplates 1 and 2 to be released from each other. The member 7 is of a tubular configuration and comprises an annular clamping flange 10 which co-operates with the cams 6 to clamp the stabplates 1 and 2 together and a generally cylindrical portion 11 extending therefrom and carrying a portion 12 having flat opposite faces 13 from which extend portions 14 each having a groove 15—see FIG. 2.

Each cam 6 is pivotable about pivot bars 8 via a respective pivot pin 16. Also each cam 6 carries a respective pin 17 slidable in a respective one of the slots 15 of member 7 and a respective pin 18 slidable in a respective slot 19 in locking bar 9. Each slot 19 has a recess 20 or 21 at each end, in FIG. 3a the pins 18 being shown engaged in the inner recesses 20 of slots 19. In FIG. 1, for clarity, the pins 16 and 18 have been omitted.

Figure 3B:
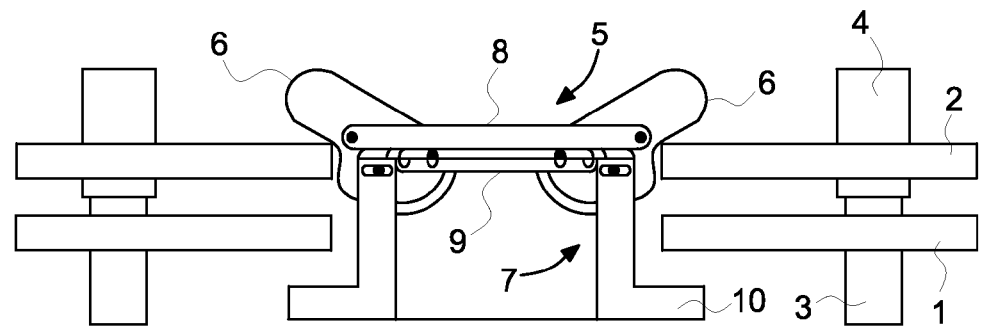

FIG. 3b shows the first stage of separating the stabplates 1 and 2. The locking bar 9 is pulled in a direction downwards in the figure to release the cams 6 and also to cause them to rotate relative to bars 8 about the pivot pins 16.

Figure 3C:
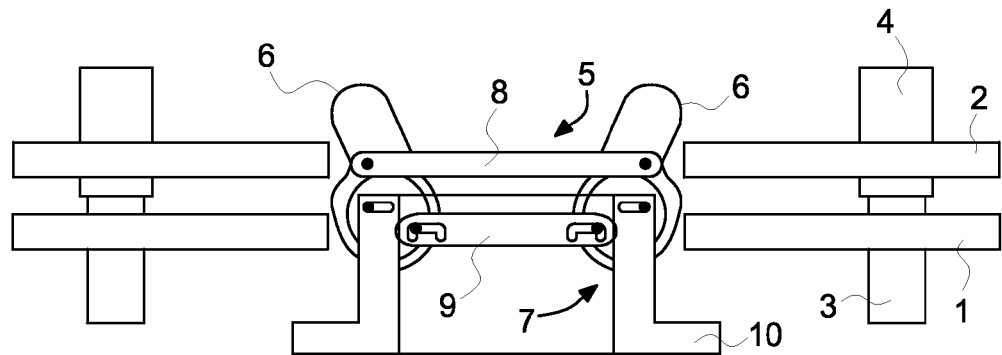
Figure 3D:
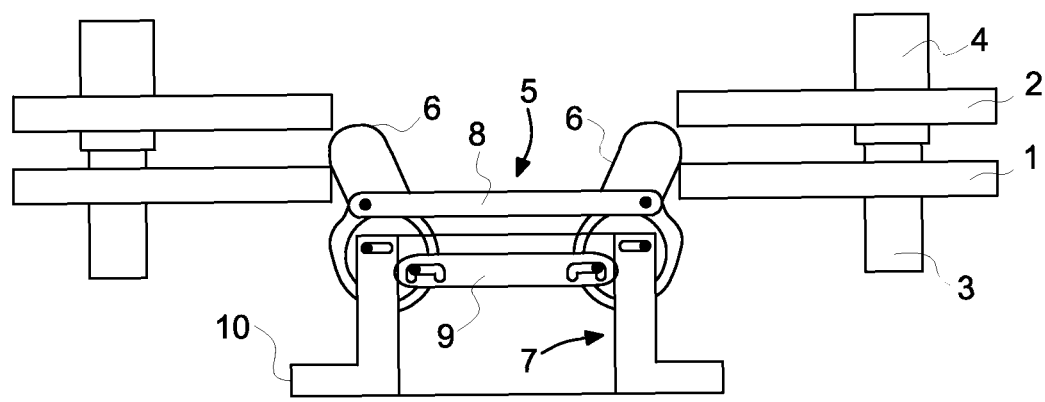
Figure 3E:
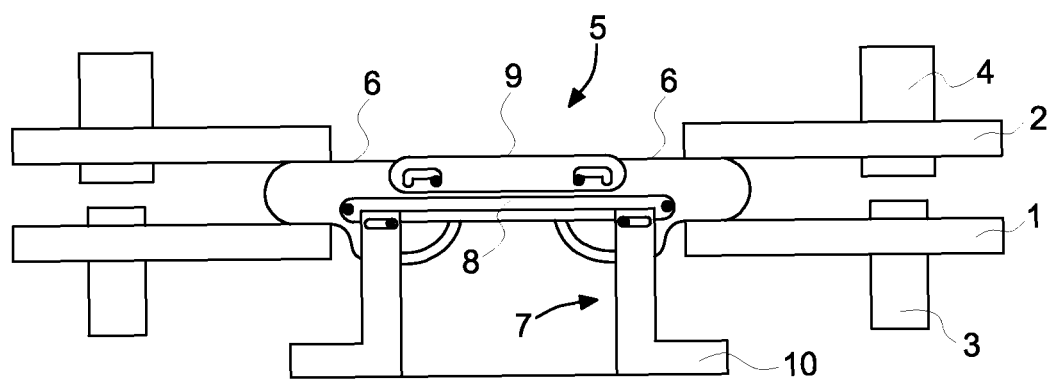

FIG. 3c shows this process continuing until the mechanism 5 with its cams 6 can be withdrawn from the central orifice of the stabplates 1 and 2 to a position shown in FIG. 3d. At this point, the member 7 is pushed in a direction upwards in the figure so that the cams 6 rotate in the opposite direction and are forced between the stabplates 1 and 2, thus forcing them apart and de-mating the connectors 3 and 4, as shown in FIG. 3e. At this point, the locking bar 9 is pushed in a direction upwards in figure thus preventing the mechanism 5 from becoming detached from the stabplate 1, and allowing it to be withdrawn. At this point the stabplate 1, can be withdrawn, complete with the mechanism 5.

The above displacements are accommodated by movement of pins 17 in slots 15 and movements of pins 18 in slots 19 and into and out of recesses 20 and 21.

Re-mating of the stabplates is essentially the reverse of the process described above.

Appropriate movement of the locking bar 9 and the member 7 of the mechanism is typically effected subsea by an ROV. The figures illustrate the operation of the mechanism diagrammatically and in practice the elements operated by the ROV will be designed with operating interfaces that are amenable to the facilities available on an ROV.

Elimination of the difficulties resulting from corrosion on conventional screw threaded mechanisms and the elimination of the need for a secondary release mechanism.

What is claimed is:

1. A mechanism for clamping first and second stabplates together, the mechanism comprising:
    a first pivoted cam member;
    a clamping means in cooperation with the first pivoted cam member; and
    a second cam member, wherein the first and second cam members are pivotable to rotate in opposite directions, each cam member cooperating with the clamping means;
    wherein the first pivoted cam member is displaceable between a first position and a second position;
    wherein in the first position, in cooperation with the clamping means, the mechanism clamps the stabplates together; and
    wherein in the second position the mechanism is configured to rotate between the stabplates to separate the stabplates from each other.

2. The mechanism according to claim 1, further comprising a locking member between the cam members, the locking member being displaceable to cause pivotal rotation of the cam members.

3. The mechanism according to claim 1, further comprising a pivot member between the cam members to which each of the cam members is pivotally attached.

4. A method for clamping first and second stabplates together or unclamping first and second stabplates from each other, the method comprising:
    providing a mechanism comprising a first pivoted cam member and a clamping means in cooperation with the first pivoted cam member; and
    displacing the first pivoted cam member between a first position and a second position;
    wherein the mechanism is received via a central orifice of each of the stabplates and wherein the mechanism further comprises a second cam member, and wherein the first and second cam members pivotally rotate in opposite directions, each of which cooperate with the clamping means;
    wherein in the first position, in cooperation with the clamping means, the mechanism clamps the stabplates together; and
    wherein in the second position the mechanism is configured to rotate between the stabplates to separate the stabplates from each other.

5. The method according to claim 4, wherein the cam members are displaced by a locking member between the cam members to cause pivotal rotation of the cam members.

6. The method according to claim 4, wherein the cam members are pivotally attached for rotation to a pivot member between the cam members.

7. The mechanism according to claim 2, further comprising a pivot member between the cam members to which each of the cam members is pivotally attached.

8. The mechanism according to claim 7, wherein the clamping means further comprises at least one pin and at least one slot which are slidable relative to each other, wherein displacing the locking member is caused by a relative movement of the at least one pin and the at least one slot.

9. The method according to claim 5, wherein the cam members are pivotally attached for rotation to a pivot member between the cam members.

10. The method according to claim 9, wherein the clamping means further comprises at least one pin and at least one slot which are slidable relative to each other, wherein displacing the locking member is caused by a relative movement of the at least one pin and the at least one slot.

* * * * *